United States Patent Office 3,531,436
Patented Sept. 29, 1970

3,531,436
POLYIMIDES OF SUBSTITUTED PHTHALIC ANHYDRIDE
Stanley Robert Sandler, Springfield, Florence Ray Berg, Philadelphia, and George Kitazawa, Yardley, Pa., assignors to Borden, Inc., New York, N.Y., a corporation of New Jersey
No Drawing. Continuation of application Ser. No. 493,237, Oct. 5, 1965. This application Apr. 21, 1969, Ser. No. 818,200
Int. Cl. C08g 20/32
U.S. Cl. 260—47
7 Claims

ABSTRACT OF THE DISCLOSURE

The present invention relates to imides and polyimides having the general structural formula

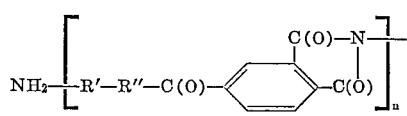

wherein:
(1) R′ is a hydrocarbon moiety;
(2) R″ is selected from the group consisting of (a)

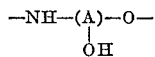

wherein A is the hydrocarbon moiety of a monohydric alcohol containing at least one epoxy group, and (b) —NH—; and
(3) $n$ is an integer up to about 100.

---

This is a streamlined continuation of application Ser. No. 493,237, filed Oct. 5, 1965.

This invention relates to polymeric imides and more particularly to polyimides of phthalic anhydride. Polyimides of this invention have high temperature stability. These polymers are useful as protective coatings on surfaces which are exposed to elevated temperature during use.

The present invention provides imides and polyimides of phthalic anhydride. The invention comprises a polymer having the following general structural formula:

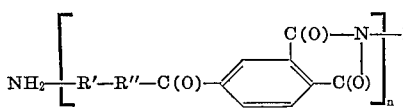

wherein R′ is a hydrocarbon or substituted hydrocarbon examples of which include aryl, alkaryl, oxyaryl, and alkyl; R″ is selected from the group consisting of (a),

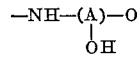

(2)

wherein A is selected from the group consisting of saturated and unsaturated aliphatic, cycloaliphatic, aromatic and heterocyclic hydrocarbon moieties which moieties may further be substituted with noninterfering substituents such as halogen atoms, and (b), —NH—; and $n$ is an integer up to about 100. The polyimides may readily be prepared from substituted phthalic anhydride and a diamine by inducing polymerization under elevated temperatures.

The substituted phthalic anhydride starting materials may be the acid halide of trimellitic anhydride, a hydroxyepoxy adduct of trimellitic anhydride, and an amide-amine adduct of trimellitic anhydride. Unsubstituted trimellitic anhydride is of limited value for direct polymerization to the polyimide and the invention will further be described in connection with substituted trimellitic anhydride. Where an amide-amine adduct is used as the monomeric component, additional diamine is not required for polymerization. Where the acid halide is used, an acid acceptor is added to advantage to the reaction medium. Polymerization is generally carried out in a solvent for the starting materials which may also be a solvent for the final polymer.

Conventional solvents are used in the polymerization which are nonreactive with the reactants. Examples of the solvent include benzene and like aromatic and alkaromatic solvents, dimethylformamide and dimethylacetamide.

When an acid halide is used, it is reacted with a diamine of the structural formula NH₂R′NH₂ under elevated temperatures as between 50°–330° C. (R′ is the same as above defined.) The reaction may take as long as 24 hours to complete, the rate being reduced with increased temperature.

When an epoxy adduct is a comonomer, it is polymerized with a diamine of the same structural formula shown above, under elevated temperatures as in the range of 50°–330° C.

Where it is desired to produce the amide-amine monomeric unit and then polymerize this monomer, starting materials such as the acid halide of trimellitic anhydride are used to advantage. The halide is reacted with a diamine under reduced temperatures as below about 20° C. and preferably in the range 0–5° C. The amide-amine adduct is then auto-polymerized to form the polyimide of this invention by reaction under elevated temperatures.

As to proportions, molar equivalents of the monomeric components are preferred such as to provide a one to one addition polymer between the substituted phthalic anhydride and the diamine.

As to materials, an acid halide of trimellitic anhydride, represented by the following structural formula (X being chloride, bromide or iodide):

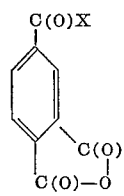

(3)

is the basic starting reactant.

The acid halide anhydride is made as by reaction of trimellitic anhydride with halogenating compounds; examples of such known compounds include thionyl chloride, phosphorous pentachloride or the corresponding halide and the like. The acid halide anhydride is further reacted with a diamine and if desired an epoxyalcohol depending upon the type of copolymer or polymer, and reactions desired.

The diamine component, represented by the structural formula, $NH_2R'NH_2$, should have at least two primary amino groups therein and may have additional amino groups in the structure to favor cross-linking. The anhydride ring is opened by a primary amino nitrogen to form the imido linkage. Polymerization therefore requires one such primary amino group for each anhydride ring. The reaction with the halide or epoxy portion of said anhydride may be either through a primary or secondary amino group. Although a diamine having one primary and one secondary group could theoretically be used, it has been found that in order to achieve the relatively high degree of polymerization as up to about 100 units, and cross-linking of the instant invention, it is preferable to use an amine having at least two primary amino groups therein. A diamine containing at least two primary amino groups provides the additional reactive hydrogen available for cross-linking of the polymer and probable prevention of termination of the polymer chain. Chain termination probability would be enhanced if a diamine having only one primary and one secondary amino group were used, and the primary amino group was reacted with the halide or epoxy moiety. This would thereby leave unreacted the anhydride ring, there being a lack of available primary amino groups. Primary amino diamines eliminate the possibility of this occurring.

The primary amino diamines may have noninterfering substituent groups within their structure such as oxy, halide and sulfonyl groups. R' may be aryl such as phenyl and biphenyl; alkaryl such as $C_1$-$C_6$ alkyl diphenyl; oxyaryl such as oxy diphenyl; alkyl such as $C_1$-$C_6$ alkyl; and cycloaliphatic such as $C_1$-$C_6$ alkyl substituted $C_3$-$C_8$ cycloaliphatic moieties. Examples of the preferred primary amino diamines include:

4,4'-diamino diphenylmethane (methylene dianiline), 4,4'-diamino diphenyl ether (oxydianiline), 1,6-hexane diamine, 1,2-ethylene diamine and 1-methyl, 1-amino, 4-(2-amino)propyl cyclohexane.

As to the hydroxyepoxy reactant, it comprises those monohydric alcohols possessing at least one epoxy group, i.e., a

(4)

group. These alcohols may be aliphatic, cycloaliphatic, aromatic or heterocyclic and may be saturated and unsaturated and substituted with noninterfering substituents such as halogen atoms and contains between three-fifteen carbon atoms. Examples of these epoxy substituted alcohols include epoxyalkanols, epoxyalkoxyalkanols, epoxyalkenols, epoxyalkoxyalkenols, and cyclo derivatives thereof. Examples of these epoxyalcohols include: 2,3-epoxypropanol (glycidol), 3,4-epoxybutanol, 2,3-epoxyhexanol, epoxidized octadecadienol, 3,4-epoxydihydropyran - 5 - propanol, 2,3 - dimethyl-4,5-epoxyoctanol, 2-methoxy - 4,5 - epoxyoctanol, 3,4-epoxy-5-chlorocyclohexanol, 2,3 - epoxypropoxypropanol, 2,3 - epoxypropoxyhexanol, 2,3 - epoxypropoxy - 2,3 - dihydroheptanol, 2-3-epoxydodecanol, 4-chloro-5,6-epoxydodecanol, 3,4 - epoxydodecanol, 2,3-epoxycyclohexanol, 2,3-epoxy-5-octanol, 2,3-epoxy-6-dodecanol, 2,3 - epoxypropoxy-5-octenol, 2,3-epoxypropoxy - 4 - cyclohexanol, and the like.

Particularly preferred are the monoepoxy substituted alkanols containing between 3–8 carbon atoms and having the epoxy group in the terminal position. Within this group 2,3-alkanol such as 2,3-epoxypropanol are preferred.

The following is a brief description of the process steps.

(1) Preparation of acid halide of phthalic anhydride.—Trimellitic anhydride and excess thionyl chloride are heated to reflux until the reaction is substantially complete. The product is collected by fractional distillation. It is believed to have the following structural formula:

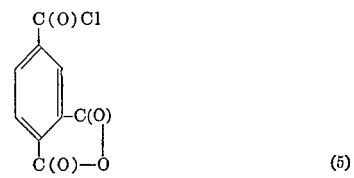

(5)

A molar excess of the chloride is used, as about 4 moles of chloride to 1 mole of the anhydride.

(2) Preparation of trimellitic epoxy ester.—Trimellitic anhydride mono acid halide (preferably the chloride) is dissolved in a solvent, such as benzene, and added slowly to a precooled solution of a hydroxyepoxy, acid acceptor and solvent. The reaction is maintained at the reduced temperature, as in the range of 0°–5° C. After the reaction is essentially complete, the amine salt is separated and the epoxy ester is concentrated from the solvent. Approximately equal molar proportions of the halide, the epoxy, and the acid-acceptor are used. In an alternate procedure, acid acceptor and acid halide are added simultaneously to the epoxyalcohol at 0°–5° C.

(3) Preparation of amide-amine adduct of trimellitic anhydride.—Trimellitic anhydride mono acid halide (preferably the chloride) is dissolved in a solvent, such as benzene, and added slowly to a precooled solution of the diamine, acid-acceptor and solvent. The reaction is maintained at the reduced temperature, as in the range of 0°–5° C. After the reaction is essentially complete, the acid portion is separated and the adduct concentrated. Approximately equal molar proportions of the halide and diamine are used. The acid-acceptor is used in molar proportion approximately equal to its acid accepting value, i.e., equal molar proportions if triethylamine is used, however, one-half the molar quantity if sodium carbonate is the acid acceptor.

If an unsymmetrical diamine is used, as for example,

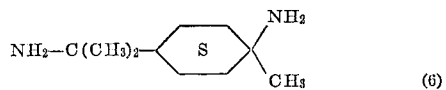

(6)

(1-methyl, 1-amino, 4-(2-amino)propylcyclohexane) the resulting amide-amine adduct is a combination of the two possible products, whereas if a symmetrical diamine, such as

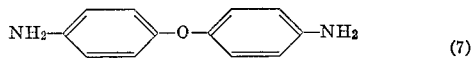

(7)

(oxydianiline) is used, the amide-amine adduct is uniform.

In the examples that follow and elsewhere herein, proportions are expressed as parts by weight unless specifically stated to the contrary.

EXAMPLE 1

(Copolymerization of acid halide and diamine)

Trimellitic anhydride acid chloride (21.1 g.) dissolved in 100 ml. dimethylformamide was added dropwise to cold (0° C.) solution of oxydianiline (20.0 g.) and triethylamine (10.1 g.) in 100 ml. dimethylformamide keeping the pot temperature at 0° to 5° C. Stirring at this temperature was continued for two hours after final addition. The cold solution was stirred vigorously into 500 ml. of an ice and water mixture, and the precipitated product was quickly collected by vacuum filtration, rinsed with cold methanol and dried in a vacuum oven to constant weight. The product

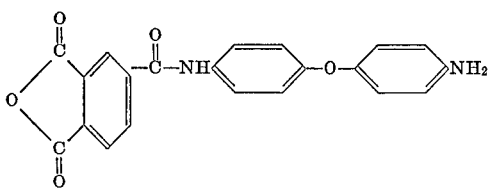

(8)

(38 g.) was a gray solid, melting point greater than 335° C. percent nitrogen: Found, 7.32; calc'd. 7.5.

The product may be polymerized directly in dimethylformamide to give a dimethylformamide solution of the polyimide which can be used to protectively coat articles or prepare films therefrom.

EXAMPLE 2

(Copolymerization of epoxy ester and diamine)

Liquified methylenedianiline (2.0 g.) was thoroughly mixed with monoglycidyl trimellitic anhydride (2.5 g.) and the mixture heated for 3 hours at 250° C. in a Wood's metal bath.

This reaction can also be carried out in dimethylformamide to give the polymer in solution.

Polymer

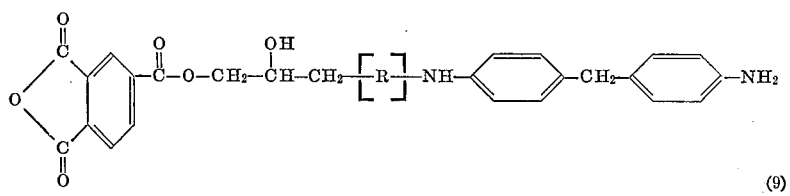

wherein R is

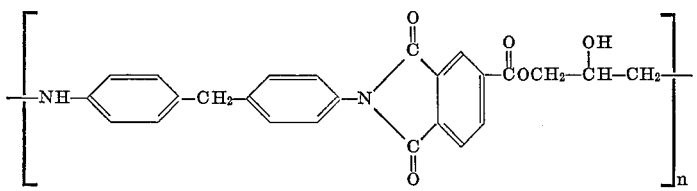

(9)

*Analysis.*—Calcd. for $C_{25}H_{20}O_5N_2$ (percent): C, 70.1; H, 4.67. Found (percent): C, 69.49; H, 4.19.

EXAMPLE 3

(Polymerization of amide-amine adduct of trimellitic anhydride)

The intermediate adduct was obtained by the procedure described in Example 1 except that the oxydianiline was replaced by 1,6-hexandiamine (11.6 g.). The adduct (11 g.) was obtained as pale yellow crystals which softened at 130° C. and melted at 180–210° C. After heating for 2 hours at 170–180° C. in an oil bath, the product was a transparent, brown solid.

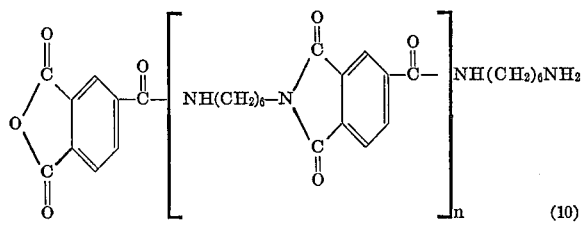

(10)

Heating the dimethylformamide solution without isolating the product gave the polyimide in solution.

EXAMPLE 4

The polymeric materials made as in Examples 1, 2 and 3 are prepared as therein described except that the diamine therein used is replaced separately and in turn by the diamines herein previously disclosed.

EXAMPLE 5

The copolymer of Example 2 is made as therein described except that the epoxy adduct of the acid halide therein used is replaced separately and in turn by the hydroxyepoxy compounds herein previously disclosed.

It will be understood that it is intended to cover all changes and modifications of the examples of the invention herein chosen for the purpose of illustration which do not constitute departures from the spirit and scope of the invention.

What is claimed is:

1. A polyimide having the general structural formula

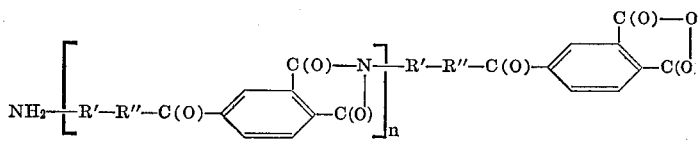

wherein:
  (a) R′ is a hydrocarbon selected from the group consisting of divalent aryl, alkaryl, oxyaryl, and alkyl moieties;
  (b) R″ is

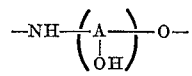

wherein A is the hydrocarbon moiety of a monohydric alcohol containing at least one epoxy group of the formula

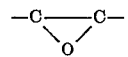

and
  (c) n is an integer having a value of from 1 up to about 100.

2. The polyimide of claim 1 wherein:
  (a) R′ is selected from the group consisting of phenyl, biphenyl, $C_1$–$C_6$ alkyl diphenyl, oxydiphenyl, $C_1$–$C_6$ alkyl, and $C_1$–$C_6$ alkyl substituted $C_3$–$C_8$ cycloaliphatic divalent moieties:
  (b) R″ is

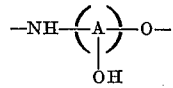

and A is the hydrocarbon moiety of a monohydric alcohol containing at least one epoxy group of the formula

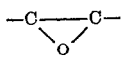

said alcohol being selected from the group consisting of 2,3-epoxypropanol, 3,4-epoxybutanol, 2,3-epoxyhexanol, epoxidized octadecadienol, 2,3-dimethyl-4,5-epoxyoctanol, 2 - methoxy-4,5-epoxyoctanol, 3,4-epoxy - 5 - chlorocyclohexanol, 2,3-epoxypropoxypropanol, 2,3-epoxypropyhexanol, 2,3-epoxydodecanol, 4 - chloro-5,6-epoxydodecanol, 3,4-epoxydodecanol, 2,3 - epoxycyclohexanol, 2,3 - epoxy-5-octanol, 2,3-epoxy-6-dodecanol, 2,3-epoxypropoxy-5-octenol and 2,3-epoxypropoxy-4-cyclohexanol.

3. The polyimide of claim 2 wherein R' is 1,6-hexylene and the other variables are as therein defined.

4. The polyimide of claim 2 wherein R' is an oxydiphenyl divalent moiety and the other variables are as therein defined.

5. The polyimide of claim 2 wherein R" is

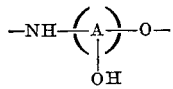

A is the hydrocarbon moiety of 2,3-epoxypropanol and the other variables are as therein defined.

6. The polyimide of claim 2 wherein R' is a methylene diphenyl divalent moiety and the other variables are as therein defined.

7. The polyimide of claim 4 wherein R" is

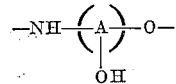

A is the hydrocarbon moiety of 2,3-epoxypropanol and the other variables are as therein defined.

References Cited

UNITED STATES PATENTS 3,260,691  7/1966  Lavin et al. _____ 260—78

FOREIGN PATENTS 570,858  7/1945  Great Britain.

WILLIAM SHORT, Primary Examiner

T. E. PERTILLA, Assistant Examiner

U.S. Cl. X.R.

117—161; 260—78